(12) United States Patent
Kimura

(10) Patent No.: US 10,571,899 B2
(45) Date of Patent: Feb. 25, 2020

(54) OPERATING STATE ACQUISITION APPARATUS, PRODUCTION MANAGEMENT SYSTEM, AND PRODUCTION MANAGEMENT METHOD FOR MANUFACTURING LINE

(71) Applicant: i Smart Technologies Corporation, Hekinan-shi, Aichi-ken (JP)

(72) Inventor: Tetsuya Kimura, Gamagori (JP)

(73) Assignee: I SMART TECHNOLOGIES CORPORATION, Hekinan-Shi, Aichi-Ken (JP)

(*) Notice: Subject to any disclaimer, the term of this patent is extended or adjusted under 35 U.S.C. 154(b) by 0 days.

(21) Appl. No.: 15/654,445

(22) Filed: Jul. 19, 2017

(65) Prior Publication Data
US 2018/0052452 A1  Feb. 22, 2018

(30) Foreign Application Priority Data
Aug. 18, 2016  (JP) .................. 2016-160363

(51) Int. Cl.
*G05B 23/00* (2006.01)
*G05B 19/418* (2006.01)
(Continued)

(52) U.S. Cl.
CPC .......... *G05B 19/41875* (2013.01); *G01J 1/38* (2013.01); *G05B 19/048* (2013.01); *G05B 19/4183* (2013.01); *G05B 19/41865* (2013.01); *G07C 3/005* (2013.01); *G05B 19/4184* (2013.01); *G05B 19/41815* (2013.01); *G05B 19/41835* (2013.01); *G05B 19/41855* (2013.01);
(Continued)

(58) Field of Classification Search
None
See application file for complete search history.

(56) References Cited

U.S. PATENT DOCUMENTS 4,142,238 A * 2/1979 Brandt .................. G07C 3/12
340/526
4,815,112 A * 3/1989 Kuze ................... G05B 19/045
377/16
(Continued)

FOREIGN PATENT DOCUMENTS

CN 1945476 A 9/2006
EP 3306425 4/2018
(Continued)

OTHER PUBLICATIONS

U.S. Appl. No. 15/654,456, filed Jul. 19, 2017, Kimura, Tetsuya.
(Continued)

*Primary Examiner* — Paul B Yanchus, III
(74) *Attorney, Agent, or Firm* — Weaver Austin Villeneuve & Sampson LLP

(57) ABSTRACT

An operating state acquisition apparatus 20a includes a detector 21a retrofitted to be mounted on a production equipment 31 disposed on a manufacturing line L1, or retrofitted to be disposed in a vicinity of the production equipment 31, the detector outputting a detection signal indicating an operating state of the production equipment. The operating state acquisition apparatus 20a includes a transmitter 21a configured to transmit a detection signal to a management apparatus 10.

11 Claims, 14 Drawing Sheets

(51) Int. Cl.
*G05B 19/048* (2006.01)
*G07C 3/00* (2006.01)
*G01J 1/38* (2006.01)
*G06Q 10/06* (2012.01)

(52) U.S. Cl.
CPC .............. *G05B 2219/24097* (2013.01); *G05B 2219/31433* (2013.01); *G05B 2219/31434* (2013.01); *G05B 2219/31445* (2013.01); *G05B 2219/31455* (2013.01); *G05B 2219/33284* (2013.01); *G06Q 10/0633* (2013.01); *Y02P 90/04* (2015.11); *Y02P 90/10* (2015.11); *Y02P 90/20* (2015.11)

(56) References Cited

U.S. PATENT DOCUMENTS

| | | | |
|---|---|---|---|
| 5,870,698 A * | 2/1999 | Riedel | G05B 19/406 700/1 |
| 6,374,160 B1 * | 4/2002 | Forjahn | B05C 1/02 118/682 |
| 2003/0204371 A1 | 10/2003 | Sciamanna | |
| 2011/0141266 A1 | 6/2011 | Fontanot | |
| 2015/0140986 A1 * | 5/2015 | Lamb | H04L 41/0659 455/418 |
| 2018/0053124 A1 | 2/2018 | Kimura | |

FOREIGN PATENT DOCUMENTS

| | | |
|---|---|---|
| EP | 3312694 | 4/2018 |
| JP | 2000/259222 A | 9/2000 |
| JP | 2001/022852 | 1/2001 |
| JP | 2003-091312 A | 3/2003 |
| JP | 2009-025851 A | 2/2009 |
| JP | 2010/022852 A | 1/2010 |
| JP | 2010-146256 A | 7/2010 |
| KR | 2010-0100291 A | 9/2010 |
| WO | 03/021534 A1 | 3/2003 |

OTHER PUBLICATIONS

U.S. Appl. No. 15/654,456, Non-Final Office Action, dated Oct. 5, 2018.
U.S. Appl. No. 15/654,456, Final Office Action, dated Apr. 4, 2019.
U.S. Appl. No. 15/654,456, Advisory Action, dated Jul. 3, 2019.
U.S. Appl. No. 15/654,456, Notice of Allowance, dated Sep. 11, 2019.
U.S. Appl. No. 15/654,456, Corrected Notice of Allowance, dated Nov. 12, 2019.
U.S. Appl. No. 16/696,168, filed Nov. 26, 2019, Tetsuya Kimura.

* cited by examiner

| | | CT | OPERATION HOUR | PRODUCTION VOLUME | COMPLETED VOLUME/H | OPERATION RATE |
|---|---|---|---|---|---|---|
| | SHIFT 1 | 62.0 | 8.8h | 462 | 52.3 | 90.1 |
| W1 | REST | 62.0 | 0.3h | 18 | 54.0 | 93.0 |
| | SHIFT 2 | 62.0 | 1.7h | 99 | 58.9 | 101.4 |
| | TOTAL | 62.0 | 10.5h | 579 | 53.4 | 91.9 |

SHIFT 1 CT:62

| TIME ZONE | PLANNED VOLUME | ACTUAL VOLUME | OPERATION RATE | |
|---|---|---|---|---|
| 05:30-06:30 | 58 | 51 | 87.8 | |
| 06:30-07:30 | 58 | 43 | 74.1 | W2 |
| 07:30-07:40 | 10 | 10 | 100.0 | |
| 07:40-08:40 | 58 | 50 | 86.4 | |

| 2016/08/01 5:29 T0 | | | | |
|---|---|---|---|---|
| LINE | PRODUCTION EQUIPMENT | OPERATION DELAY | PRODUCTION EFFICIENCY(%) | B1 |
| L1 | | | 70 | (DETAIL) |
| | 31 | 0 | 100 | (DETAIL) |
| | 32 | 5 | 90 | (DETAIL) |
| | 33 | 0 | 100 | (DETAIL) |
| | 34 | 3 | 70 | (DETAIL) |
| L2 | | | | |
| | 35 | | | |
| | 36 | | | |
| | 37 | | | |
| | 38 | | | |

| STOP PERIOD INFORMATION | | | |
|---|---|---|---|
| RANKING | STOP PERIOD | OCCURRENCE TIME | RETURN TIME |
| 1 | 50MIN16SEC | 9:33:30 | 10:23:47 |
| 2 | 15MIN07SEC | 15:11:58 | 15:27:05 |
| 3 | 9MIN21SEC | 13:14:47 | 13:24:08 |
| 4 | 7MIN34SEC | 6:24:06 | 6:31:41 |
| 5 | 6MIN18SEC | 7:12:45 | 7:19:03 |

| TIME | CT |
|------|------|
| 13:34:01 | 60.9 |
| 13:31:59 | 58.8 |
| 13:31:00 | 60.8 |
| 13:29:59 | 60.5 |
| 13:28:59 | 62.8 |
| 13:27:56 | 60.8 |
| 13:26:55 | 55.5 |
| 13:26:00 | 55.1 |
| 13:25:05 | 56.8 |
| 13:24:08 | 561.3 ← CT1 |
| 13:14:47 | 62.6 |
| 13:13:44 | 60.2 |
| 13:12:44 | 31.0 |
| 13:12:13 | 71.2 |
| 13:08:39 | 60.7 |
| 13:06:38 | 60.5 |
| 13:04:37 | 62.1 |
| 13:03:35 | 29.7 |
| 13:03:05 | 92.3 |
| 13:01:33 | 59.4 |
| 13:00:34 | 46.5 |
| 12:59:47 | 322.5 |

14

OPERATING STATE ACQUISITION APPARATUS, PRODUCTION MANAGEMENT SYSTEM, AND PRODUCTION MANAGEMENT METHOD FOR MANUFACTURING LINE

CROSS REFERENCE TO RELATED APPLICATION

The present application claims priority to Japanese patent application No. 2016-160363 filed on Aug. 18, 2016, the entirety of disclosure of which is hereby incorporated by reference into this application.

BACKGROUND

The present invention relates to an operating state acquisition apparatus, a production management system and a production management method for managing a production state of a manufacturing line.

Conventionally, at a manufacturing line, products are produced by controlling various devices disposed on a manufacturing line with a programmable logic controller (PLC) or a personal computer. A PLC is basically configured with a calculation unit, an input unit and an output unit. Detection information indicating operating states of various devices is input from a detection device via the input unit, and the operating states of various devices are determined based on the detection information by the calculation unit. Then, a control instruction for allowing each of various devices to execute the determined operating state is output to an actuator of each of various devices via the output unit.

However, a conventional PLC that is exclusively intended to operate a manufacturing line without causing abnormality, to detect abnormality occurring in various devices, to prevent occurrence of abnormal operation in various devices, and/or to indicate current operating states of various devices is not suitable for managing a production state of an entire manufacturing line nor for managing a production efficiency of the manufacturing line. That is, a PLC is a device programmed according to each device to be controlled so as to be provided in each device, not being a device for controlling an entire manufacturing line. Therefore, in some cases, the detection information input in each PLC is not suitable to be used in management of a manufacturing line. In addition, aggregation of the detection information from each PLC requires a communication unit for communication with an external device, for example, a server, and each PLC has a unique communication protocol. Furthermore, each PLC is configured in one unit including a calculation unit, an input unit and an output unit, which is expensive.

Some manufacturing lines do not have a PLC or a personal computer. It is not realistic to newly introduce a PLC to such a manufacturing line, in order to manage the production state and the production efficiency thereof.

Therefore, it is desired to manage the production state and the production efficiency in a manufacturing line by a simple apparatus.

The present invention provided so as to solve at least a part of the above-described problems is to manage the production state and the production efficiency of a manufacturing line by a simple apparatus.

SUMMARY

The present invention adopts following various aspects to solve at least a part of the above-described problems.

A first aspect provides an operating state acquisition apparatus retrofitted and used for managing a production state of a manufacturing line. The operating state acquisition apparatus according to the first aspect includes a detector retrofitted to be mounted on a production equipment disposed on the manufacturing line, or retrofitted to be disposed in a vicinity of the production equipment, the detector outputting a detection signal indicating an operating state of the production equipment; and a transmitter configured to transmit the detection signal to a management apparatus different from an apparatus for controlling the production equipment.

The operating state acquisition apparatus according to the first aspect includes the detector retrofitted to be mounted on a production equipment disposed on the manufacturing line, or retrofitted to be disposed in a vicinity of the production equipment. This allows a management of the production state and the production efficiency of the manufacturing line.

In the operating state acquisition apparatus according to the first aspect, the production equipment may include a display apparatus indicating an operating state of the production equipment by light, and the detector may include, as a first detector, a light sensor mounted on the display apparatus, and acquiring the operating state indicated by the display apparatus to output the detection signal. This enables easily acquiring the operation status indicated by the display apparatus with the first detector.

In the operating state acquisition apparatus according to the first aspect, the detector may further include a second detector for outputting a detection signal corresponding to start, in operation or completion of a processing action of the production equipment, as the detection signal indicating the operating state of the production equipment. This enables acquiring the detection signal corresponding to the timing related to the processing action of the production equipment with the second detector.

In the operating state acquisition apparatus according to the first aspect, the second detector may be a detector for counting a number of times of start, in operation or completion of the processing action of the production equipment. This enables acquiring the detection signal corresponding to the timing related to the processing action of the production equipment and the number of action of the production equipment.

In the operating state acquisition apparatus according to the first aspect, the second detector may be at least one detector selected from a group including a light sensor, a sound sensor, a heat sensor, a current sensor, a distance sensor, an atmospheric pressure sensor, an acceleration sensor, a rotational speed sensor, a humidity sensor and a pressure sensor. In such a case, a general sensor is available as the detector.

A second aspect provides production management system for managing a production state of a manufacturing line. The production management system according to the second aspect includes the operating state acquisition apparatus according to the first aspect; and the management apparatus configured to receive the detection signal transmitted from the operating state acquisition apparatus.

The production management system according to the second aspect includes the detector retrofitted to be mounted on a production equipment disposed on the manufacturing line, or retrofitted to be disposed in a vicinity of the production equipment, and the retrofitted operating state acquisition apparatus. This allows a simple apparatus to manage the production state and the production efficiency of the manufacturing line.

The production management system according to the second aspect, the management apparatus may include a generation unit for receiving a plurality of the detection signals and generating an information on production state of the manufacturing line. This allows generating the information on production state of the manufacturing line with the plurality of the detection signals from the operating state acquisition apparatus.

A third aspect provides a production management method of managing a production state of a manufacturing line. The production management method according to the third aspect includes receiving, from an operating state acquisition apparatus having a detector retrofitted to be mounted on a production equipment disposed on the manufacturing line, or retrofitted to be disposed in a vicinity of the production equipment, a detection signal indicating an operating state of the production equipment; and transmitting the received detection signal to a management apparatus.

The production management method according to the third aspect enables to obtain the same advantage as the production management system according to the first aspect. Further, the production management method according to the third aspect may be realized in various aspects as in the operating state acquisition apparatus according to the first aspect. Besides, the production management method according to the third aspect may also be realized as a production management program, and may also be realized as a computer-readable medium storing a production management program. Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings. To facilitate this description, like reference numerals designate like structural elements.

FIG. 9 is an explanatory drawing showing a first display example of production state information on a display device.

FIG. 10 is an explanatory drawing showing a second display example of the production state information on the display device.

FIG. 13 is an explanatory drawing showing a third display example of the production state information on the display device.

FIG. 14 is an explanatory drawing showing a fourth display example of the production state information on the display device.

DETAILED DESCRIPTION

Figure 1:
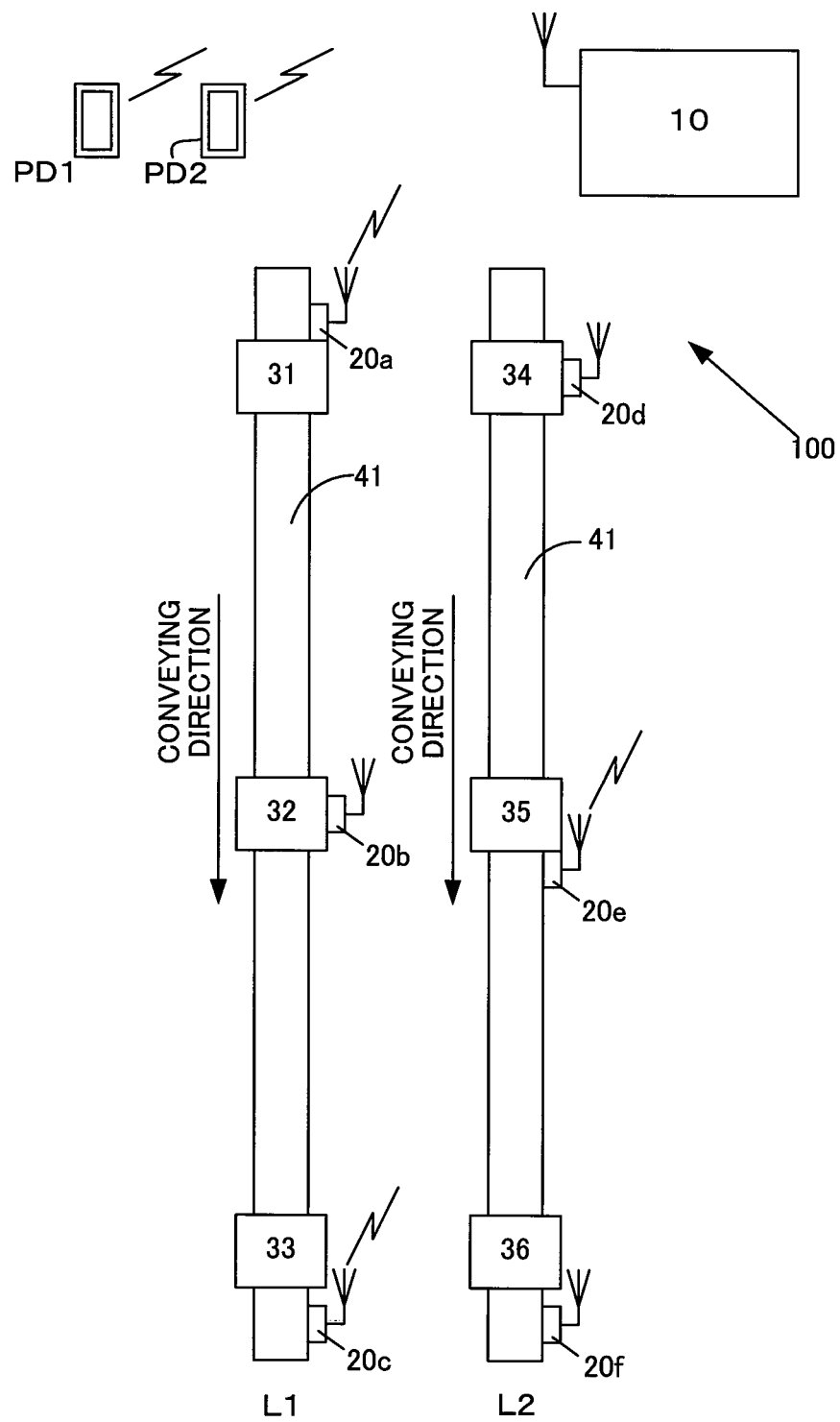
FIG. 1 is a schematic configuration drawing showing a production management system and a manufacturing line according to a first embodiment.

First Embodiment:

Herein below, a production management system and a production management method according to the present invention will be described based on embodiments with reference to the figures. FIG. 1 is a schematic configuration drawing showing a production management system and a manufacturing line according to the first embodiment. It should be noted that the production management system and the manufacturing line shown in FIG. 1 are commonly used in other embodiments.

A production management system 100 includes a production management apparatus 10 and operating state acquisition apparatuses 20a to 20f. The production management apparatus 10 manages the production states of a first manufacturing line L1 and a second manufacturing line L2 by cooperating with the operating state acquisition apparatuses 20a to 20f. It should be noted that the number of manufacturing lines L may be one, or three or more.

Each of the manufacturing lines L1 and L2 includes a conveyance mechanism 41, e.g., a conveyance machine moving on a track, for example, a belt conveyor, which carries an article to be worked, that is, a working part or a work piece. Various types of production equipment 31 to 36 are arranged on the conveyance mechanism. Each of the production equipment 31-36 is, for example, a metal processing machine, a welding machine, a resin molding machine, a coating machine, a hot forging machine, a finished piece collecting machine, and a work piece supplying machine. Each of the production equipment 31 to 36 includes a programmable logic controller (PLC) for executing a production processing and a working processing to an article to be worked by the production equipment, and various sensors connected to the PLC. In an example, the following sensor is provided: such as a photoelectric sensor for detecting arrival or passage of a work piece or a dimension sensor for measuring the dimensions of a work piece, which is incorporated in the production equipment or the conveyance mechanism, a counter for counting the number of times of use of a cutting tool for working a work piece, which is incorporated in a cutting metal processing machine for cutting a work piece, an area sensor for counting the number of discharged finished pieces, which is incorporated in a finished piece collecting machine, or a counter for counting the number of times of opening and closing operations or a cycle measuring device for measuring an interval between opening operations, which is incorporated in a hand mechanism for carrying a finished piece. In addition to the above, corresponding to the production equipment, other sensor is incorporated in the production equipment in advance, such as a temperature sensor for detecting a temperature of a work piece, a pressure sensor for detecting a resin discharge pressure or a forging pressure, or a thickness sensor for detecting a thickness of a work piece after working. Each of these sensors is conventionally disposed so as to be connected to a PLC at the time of installation and disposing of the manufacturing line and the production equipment in order to operate the manufacturing line and the production equipment.

In the example of FIG. 1, the first manufacturing line L1 includes a first production equipment 31, a second production equipment 32 and a third production equipment 33. The second manufacturing line L2 includes a fourth production equipment 34, a fifth production equipment 35 and a sixth production equipment 36.

Each of a first to a sixth operating state acquisition apparatus 20a to operating state acquisition apparatus 20f is retrofitted to be mounted on the production equipment, or disposed in the vicinity of the production equipment. In the present specification, the term "being retrofitted" means not having been incorporated nor mounted in advance so as to operate the production equipment at the time of installation of the production equipment, nor being connected to the PLC serving as a device for controlling operation of each of the production equipment 31 to 36, but being mounted or disposed regardless of the operation and management of the production equipment. In the example of FIG. 1, the second and fourth operating state acquisition apparatuses 20b, operating state acquisition apparatus 20d are respectively mounted on the second production equipment 32 and to the fourth production equipment 34. The first operating state acquisition apparatus 20a is mounted in the introduction side of the first production equipment 31, and the fifth operating state acquisition apparatus 20e is mounted in the discharge side of the fifth production equipment 35. The third and sixth operating state acquisition apparatus 20c, 20f are respectively disposed downstream in the conveying directions in the vicinities of the third and sixth production equipment 33, 36.

As shown in FIG. 1, the production management apparatus 10 and the retrofitted first to sixth operating state acquisition apparatuses 20a to 20f may mutually transmit and receive data wirelessly. In response to a request from a terminal device PD1 or a terminal device PD2, the production management apparatus 10 wirelessly transmits generated production state information. The production management apparatus 10 may be located locally in a factory as a local server, or remotely in a place other than a factory as a remote server. When the production management apparatus 10 is located as the remote server the detection signal from the retrofitted first to sixth operating state acquisition apparatuses 20a to 20f, and the production state information for the terminal devices PD1, PD2 and a local computer are sent and received by the production management apparatus 10 via a wireless access point in the factory, and an intranet or the Internet.

Figure 2:
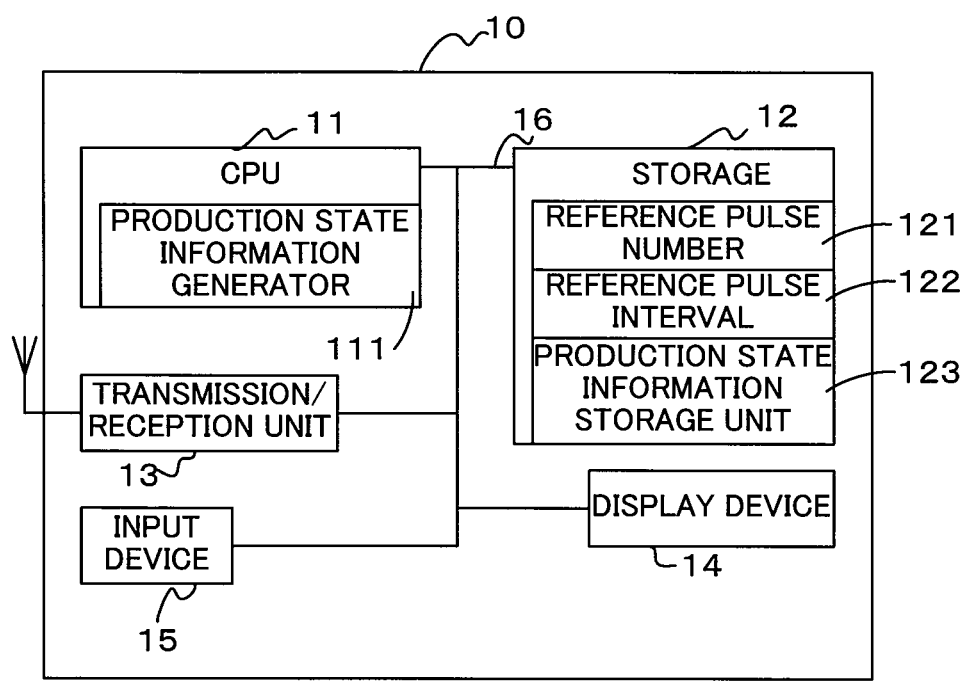
FIG. 2 is a block diagram showing an internal functional configuration of a production management apparatus according to the first embodiment.

FIG. 2 is a block diagram showing the internal functional configuration of the production management apparatus according to the first embodiment. The production management apparatus 10 is different from an apparatus (that is, a PLC) for managing operation of each of the production equipment 31 to 36. Even if the production management apparatus 10 is not used, each of the production equipment 31 to 36 is controlled by a PLC. The production management apparatus 10 includes a central processing unit (CPU) 11, a storage device 12, a transmission/reception unit 13, a display device 14 and an input device 15, which are mutually communicatively connected via a bus 16. The CPU 11, the storage device 12 and the transmission/reception unit 13 may communicate mutually and bidirectionally. The CPU 11 executes various programs stored in the storage device 12, so as to function as a generator, that is, a production state information generator 111. The storage device 12 is, for example, a RAM, a ROM or a hard disk drive (HDD). The HDD (or ROM) stores various programs for providing functions to be realized in the present embodiment, and the various programs read-out from the HDD are developed on the RAM and executed by the CPU 11. Further, the storage device 12 stores a reference pulse number 121 and a reference pulse interval 122 which the production management apparatus 10 uses to generate the production state information. In a readable/writable area of the storage device 12, a production state information storage part 123 for storing the generated production state information is provided. It should be noted that the storage device 12 temporarily stores the detection signal related to the operating state received from each of the first operating state acquisition apparatus 20a to the sixth operating state acquisition apparatus 20f.

The transmission/reception unit 13 receives, via wireless communication, the detection signal related to the operating state from each of the first to the sixth operating state acquisition apparatuses 20a to 20f mounted on each unit of production equipment on the manufacturing lines L1 and L2 or disposed in the vicinity of each unit of production equipment. The transmission/reception unit 13 transmits various execution instructions to each of the first to the sixth operating state acquisition apparatuses 20a to 20f. The transmission/reception unit 13 further transmits the production state information to the terminal devices PD1, PD2, or receives an input for requesting execution of various types of processing from the terminal devices PD1, PD2. In the case where the transmission/reception unit 13 is an input/output (I/F) device having a wireless communication function, the transmission/reception unit 13 may receive radio waves from each of the first to the sixth operating state acquisition apparatuses 20a to 20f via a wireless repeater (access point) (not shown) provided in a factory, or the transmission/reception unit 13 itself may be disposed as a wireless access point at a receivable position of radio waves from each of the first to the sixth operating state acquisition apparatuses 20a to 20f. Alternatively, the transmission/reception unit 13 may be wired to the wireless repeater. In either case, the transmission/reception unit 13 may receive the information on the operating state without wiring connection with each of the operating state acquisition apparatuses 20a to 20f. This enables the production management system 100 according to the present embodiment to be introduced in an existing factory just through relatively easy modification such as mounting or disposing of each of the first operating state acquisition apparatus 20a to the sixth operating state acquisition apparatus 20f to each unit of production equipment. Wireless communication may be provided with, for example, a wireless local area network (LAN) compliant to IEEE802.11 standard.

The display device 14 is a display for displaying processing contents when the production management system 100 is operated, or for displaying the production state information. The display device 14 may be provided separately from the production management apparatus 10, especially when the production management apparatus 10 is a remote server to generate the production state information the display device is optional. The input device 15 is a device used for inputting to the production management system 100, and is of, for example, a keyboard or a mouse, or may also be of, a pressure-sensitive-type touch panel provided on the screen of the display device 14.

Figure 3:
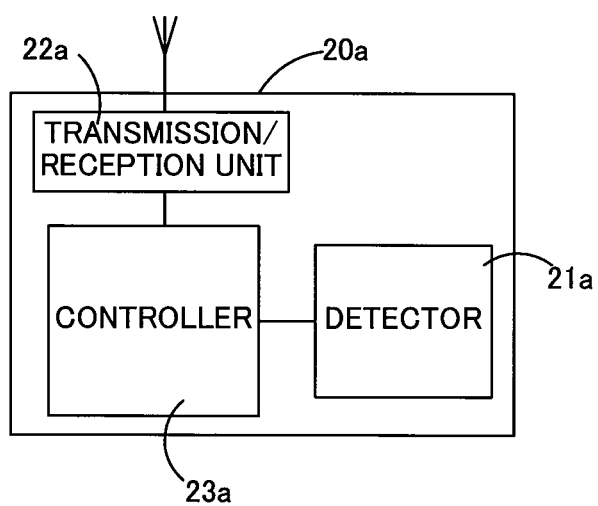
FIG. 3 is a block diagram showing an internal functional configuration of an operating state acquisition apparatus according to the first embodiment.

FIG. 3 is a block diagram showing the internal functional configuration of the operating state acquisition apparatus according to the first embodiment. In FIG. 3, the first operating state acquisition apparatus 20a is exemplarily described, but others of the second to sixth operating state acquisition apparatus 20b to operating state acquisition apparatus 20f also have the same configuration. The first operating state acquisition apparatus 20a includes a detector 21a, a transmission/reception unit 22a functioning as a transmitter, and a controller 23a. The first operating state acquisition apparatus 20a is retrofitted to be mounted or disposed on the manufacturing line or the production equipment. Each of the detector 21a and the transmission/reception unit 22a is communicatively connected to the controller 23a. The detector 21a is any of various sensors to be retrofitted to be mounted on each of the first to sixth production equipment 31 to 36 or disposed in the vicinity of each of the first to sixth production equipment 31 to 36, being different from the existing sensors that are provided by each unit of production equipment for performing a working and a processing to a work piece and which are connected to the programmable logic controller (PLC). It should be noted that the detector 21a may be provided integrally with the first operating state acquisition apparatus 20a or may be provided separately from and connected to the first operating state acquisition apparatus 20a via a signal line. The detector 21a may be a detector having only a detection element and outputting an analog signal, or a detector which has, in addition to a detection element, a circuit for converting the signal output by the detection element into a digital signal and outputting the converted digital signal. The transmission/reception unit 22a wirelessly transmits the detection signal to the production management apparatus 10 according to any of communication protocols, or receives an execution instruction from the production management apparatus 10. The controller 23a includes a central processing unit (CPU) and a storage device that are not shown. The controller 23a transmits the detection signal received from the detector 21a to the production management apparatus 10 via the transmission/reception unit 22a. In the case where the signal input from the detector 21a is an analog signal, the controller 23a converts the signal having a signal value equal to or more than a predetermined value, less than a specified value, or within an arbitrary range, into a digital signal taking High (1) according to active-High logic or taking Low (1) according to active-Low logic, and transmits the detection signal to the production management apparatus 10 via the transmission/reception unit 22a. Therefore, in the present embodiment, only the detector 21a may function as a detector, and further the detector 21a and the controller 23a may realize the detector. The controller 23a may store the detection signal received from the detector 21a in the storage device, and may transmit the detection signal to the production management apparatus 10 in response to the execution instruction received from the production management apparatus 10.

Following sensors are available as the detector 21a, such as a light sensor, a sound sensor, a heat sensor, a current sensor, a distance sensor, an atmospheric pressure sensor, an acceleration sensor, a rotational speed sensor, a humidity sensor, and a pressure sensor. Any of these sensors is a sensor for detecting the operating state of the production equipment, and the use methods thereof will be described below. It should be noted that, in the present embodiment, the operating state means the action and operation related to working and processing to an article to be worked on the manufacturing line and in the production equipment, including various states, for example, start, in operation, stop and completion of the action and operation.

Figure 4:
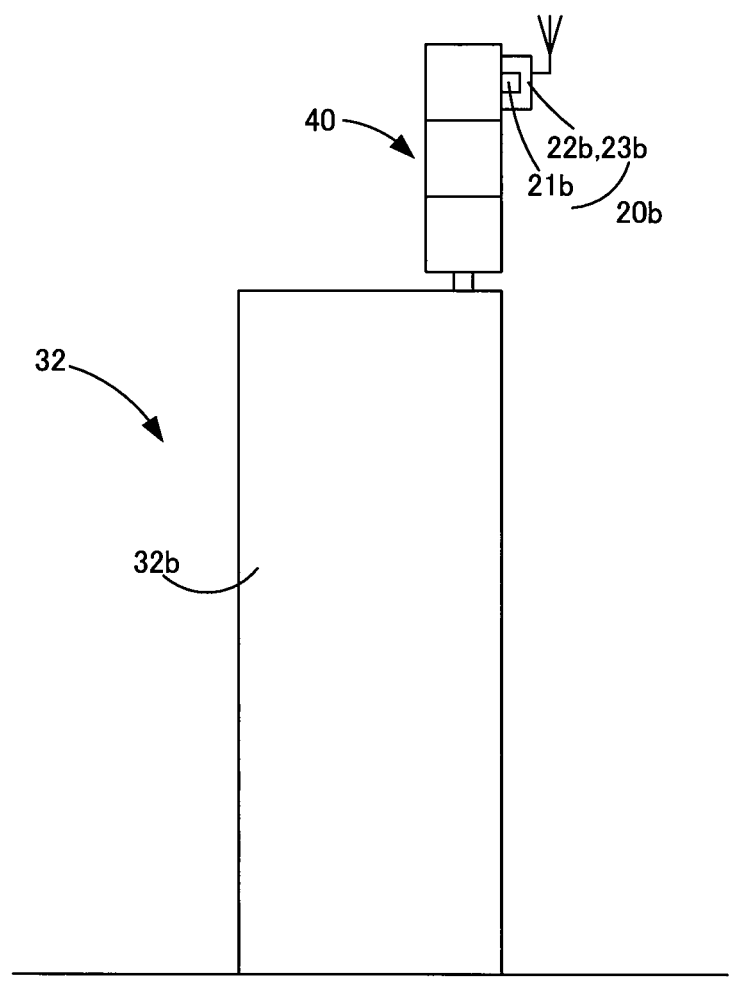
FIG. 4 is an explanatory drawing showing an arrangement example of the operating state acquisition apparatus including a light sensor as a first detector.

FIG. 4 is an explanatory drawing showing an arrangement example of the operating state acquisition apparatus including a light sensor as a first detector. The second operating state acquisition apparatus 20b is provided to the second production equipment 32. More specifically, a housing 32b that houses a PLC is disposed adjacent to the second production equipment 32, and a signal tower 40 is disposed to the housing 32b, so as to indicate the operating state of the second production equipment 32 by a three-color signal lamp. In the operating state indicated by the signal tower 40, in an example, green indicates a state of normal operation, yellow indicates a state of operator calling, and red indicates a state of abnormal stop. A photoelectric conversion element capable of detecting turning on or turning off of the signal lamp is available as a light sensor serving as the first detector, for example, a photodiode or a phototransistor. The light sensor serving as the detector 21b is mounted on, for example, a light emitting surface emitting green light of the signal light. The detector 21b may output current corresponding to a received light amount to the controller 23b. In this case, a pulse waveform indicating an ON state is generated when the light amount received by the controller 23b is equal to or more than a predetermined light amount. The detector 21b may output to the controller 23b the pulse waveform indicating the ON state when the received light amount is equal to or more than a predetermined light amount. The mounting of the second operating state acquisition apparatus 20b to the signal tower 40 enables to easily detect the operating state of the second production equipment 32 indicated by the signal tower 40, which has not been taken out in prior art. Specifically, in the above-described example, the second operating state acquisition apparatus 20b is capable of acquiring the information on the operating state indicating that the second production equipment 32 is in a normal operation, and then providing the information as the detection signal to the production management apparatus 10.

Figure 5:
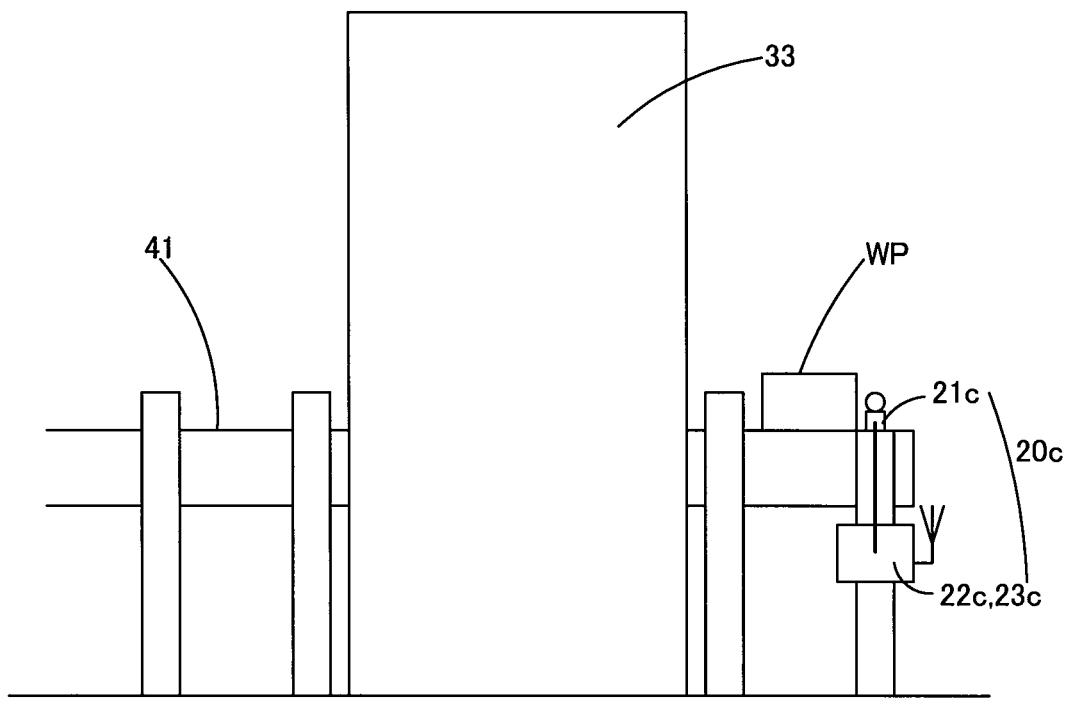
FIG. 5 is an explanatory drawing of a case where the operating state acquisition apparatus is disposed in a vicinity of production equipment.

FIG. 5 is an explanatory drawing of a case where the operating state acquisition apparatus is disposed in the vicinity of the production equipment. The third operating state acquisition apparatus 20c is disposed in the vicinity of the third production equipment 33, more specifically, being disposed at the end part of the conveyance mechanism 41 where the third production equipment 33 is disposed, that is, at a position of the line where a work-finished piece WP is discharged. The third operating state acquisition apparatus 20c has a detector 21c that is connected by a signal line with and provided separately from a main body in which a transmission/reception unit 22c and a controller 23c are housed. The detector 21c is disposed on the top of a support part that supports the conveyance mechanism 41, and the main body is disposed on an intermediate side surface of the support part. As the detector 21c, for example, a photoelectric-type light sensor is available. The photoelectric-type light sensor is capable of detecting passage of the work-finished piece WP conveyed by the conveyance mechanism 41 due to shielded light. The detection signal output at the time of shielding is a pulse signal indicating 1 or 0. The photoelectric sensor includes a light source which outputs light such as visible light, infrared light or ultraviolet light, and a light receiving unit which receives the light from the light source. The third operating state acquisition apparatus 20c is disposed in the vicinity of the third production equipment 33, thereby enabling to detect the operating state of the third production equipment 33 by detecting the presence or absence of the conveyed (discharged) work-finished piece WP. Specifically, retrofitting of the third operating state acquisition apparatus 20c for disposing enables to acquire a detection signal as the information indicating an operation cycle which is one of the operating states of the third production equipment 33, and to provide the acquired detection signal to the production management apparatus 10.

Figure 6:
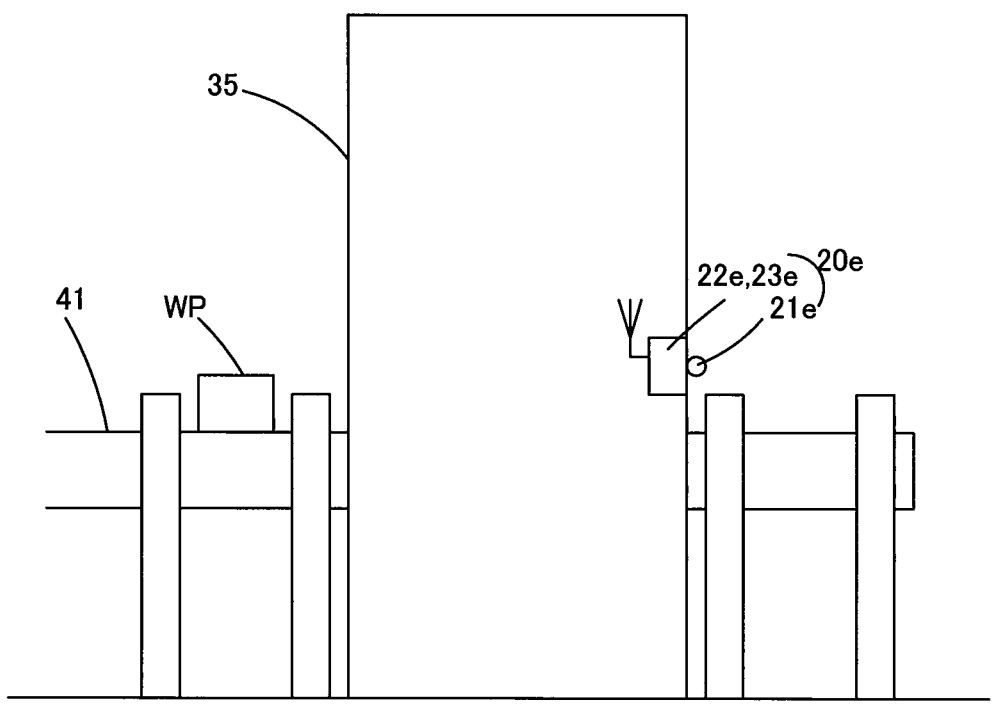
FIG. 6 is an explanatory drawing of a case where the operating state acquisition apparatus is mounted on the production equipment.

FIG. 6 is an explanatory drawing of a case where the operating state acquisition apparatus is mounted on the production equipment. The fifth operating state acquisition apparatus 20e is mounted on the fifth production equipment 35, more specifically, being provided in the downstream side of the fifth production equipment 35, that is, in the side of the fifth production equipment 35 to which a work-finished piece WP is discharged. The fifth operating state acquisition apparatus 20e has a detector 21e as the second detector provided on a main body in which a transmission/reception unit 22e and a controller 23e are housed. Following sensors are available as the detector 21e, for example, light sensor, a sound sensor, a heat sensor, a current sensor, a distance sensor, an atmospheric pressure sensor, an acceleration sensor, a rotational speed sensor, a humidity sensor and a pressure sensor. In the present embodiment, the second detector is a detector capable of measuring the timing and counting the number of times of start, in operation and completion of the action and the operation related to working and processing to an article to be worked in the production equipment. The first detector and the second detector may be individually and independently mounted or in another manner to each of the production equipment 31 to 36, or both of the first detector and the second detector may be mounted or in another manner to each of the production equipment 31 to 36.

In the case where the fifth production equipment 35 is provided with an indicator light that repeats turning on and turning off at every working cycle, the light sensor including an illuminance sensor is used to detect the number of turning on or turning off of the indicator light. The working cycle of the fifth production equipment 35 may be acquired as the operating state thereof based on the detection signal corresponding to the number of times of turning on or turning off of the indicator light. It should be noted that, in the case where a color sensor is used as the light sensor, the color sensor is capable of determining a lighting color of the indicator light having a plurality of colors, and thus capable of acquiring the operating cycle of the fifth production equipment 35 corresponding to the lighting color. A sound sensor is used to detect an operation sound such as a motor sound, an air discharge sound and a door opening/closing sound, or a sound generated at the time of working such as a cutting sound and a hammering sound in the fifth production equipment 35. In the case where a sound volume detected by the sound sensor exceeds a specified sound volume, the detection signal is output from the fifth operating state acquisition apparatus 20e, thereby enabling to acquire a cycle of the action or the working described above as the operating state.

A heat sensor is used to detect a hot work piece discharged from the fifth production equipment 35. Specifically, the following sensors are available: an infrared sensor capable of detecting a temperature of a work piece, and a thermostat capable of detecting that a temperature of a work piece is equal to or higher than a specified temperature, lower than a specified temperature, or within an arbitrary temperature range. In the case of using an infrared sensor, the infrared sensor outputs a detection signal when the detected temperature is equal to or higher than a specified temperature, or in the case of using a thermostat, the operation signal is used as a detection signal, thereby in either case enabling to acquire the working cycle of the fifth production equipment 35 as an operating state.

A current sensor including a current checker is used to detect an operation of an actuator provided in the fifth production equipment 35, or an operation of a work machine requiring power for working such as a welding machine, that is, an action relevant to discharging of a work-finished piece in the fifth production equipment 35. Specifically, in the case where the detection signal indicates that the current value during the actuator and the work machine being in operation is equal to or higher than a specified current value, lower than a specified current value, or within an arbitrary current value range, the detection signal is output from the fifth operating state acquisition apparatus 20e to the production management apparatus 10, thereby enabling to acquire the working cycle of the fifth production equipment 35 as the operating state. In addition to this, a sensor capable of measuring and detecting a high voltage such as a lightning sensor may be used to detect a high voltage (high energy) instantaneously generated in an arc welding machine or an induction hardening machine, thereby enabling to acquire the working cycle of the fifth production equipment 35 as the operating state.

A distance sensor is used to detect a work piece being discharged through the processing action and the working action of the fifth production equipment 35, or through the movement of the work piece itself, by detecting a distance to an object such as a jig, a cutting tool or a robot hand included in the fifth production equipment 35, or a work piece. Specifically, in the case where the detection signal indicates that a distance to an object is equal to or longer than a specified distance, less than a specified distance, or within an arbitrary distance range, the detection signal is transmitted from the fifth operating state acquisition apparatus 20e to the production management apparatus 10, thereby enabling to acquire the working cycle of the fifth production equipment 35 as the operating state. For example, the following sensor is available as a distance sensor: a sensor that emits an infrared light, a laser light, an ultrasonic wave, a sound wave or the like and measures a distance to an object based on an elapsed time from the emission to returning of the reflected wave reflected by the object.

An atmospheric pressure sensor and a level sensor are respectively used to detect a work piece being discharged through the working action of the fifth production equipment 35, by detecting pressure change of a liquid such as water or oil used in the cutting, washing, hardening and tempering steps which are executed in the fifth production equipment 35, and level change of a liquid used in the cutting and washing steps. Specifically, in the case where the detection signal indicates that the pressure or the water level (liquid level) is equal to or more than a specified value, less than a specified value, or within an arbitrary range, the detection signal is transmitted from the fifth operating state acquisition apparatus 20e to the production management apparatus 10, thereby enabling to acquire the working cycle of the fifth production equipment 35 as the operating state.

An acceleration sensor, a proximity switch and a Doppler sensor are arranged on a door or the top of a cylinder included in the fifth production equipment 35, and are used to detect a work piece being discharged through the opening and closing of a door or the reciprocating movement of the cylinder.

A rotational speed sensor is used to detect a work piece being discharged through the working action of the fifth production equipment 35 or through the movement of the work piece itself, by detecting a rotational speed of a jig, a cutting tool or a rotary table included in the fifth production equipment 35, a work piece or the like. Specifically, in the case where the detection signal indicates that the detected rotational speed is equal to or more than a specified value, less than a specified value, or within an arbitrary range, the detection signal is transmitted from the fifth operating state acquisition apparatus 20e to the production management apparatus 10, thereby enabling to acquire the working cycle of the fifth production equipment 35 as the operating state.

Each of a pressure sensor and a pressure-sensitive sensor is disposed on a door or an operation panel included in the fifth production equipment 35, or at a portion where pressure is applied such as by pressing or pinching, and is used to detect a work piece being discharged by detecting the opening/closing of the door, the operation on the operation panel, pressing, and/or pinching.

A gyro sensor is used to detect a work piece being discharged through the working action of the fifth production equipment 35 or through the movement of the work piece itself, by detecting the inclination and the speed of a jig, a cutting tool or a robot hand included in the fifth production equipment 35, a work piece, or the like. Specifically, in the case where the detection signal indicates that the detected inclination or speed is equal to or more than a specified distance, less than a specified distance, or within an arbitrary range, the detection signal is transmitted from the fifth operating state acquisition apparatus 20e to the production management apparatus 10, thereby enabling to acquire the working cycle of the fifth production equipment 35 as the operating state. An inclination sensor is used to detect a work piece being discharged through the working action of the fifth production equipment 35, by detecting the inclination of a jig, a cutting tool or a robot hand included in the fifth production equipment 35, a work piece or the like, or the inclination of a working device base or a seesaw-type conveying part. Specifically, in the case where the detection signal indicates that the detected inclination is equal to or more than a specified value, less than a specified value, or within an arbitrary range, the detection signal is transmitted from the fifth operating state acquisition apparatus 20e to the production management apparatus 10, thereby enabling to acquire the working cycle of the fifth production equipment 35 as the operating state.

In addition to these, a work piece being discharged may be detected by detecting human operation by use of a human detection sensor or an electrostatic capacitance type sensor, or by detecting change in humidity by use of a humidity sensor, caused by the liquid used in the cutting, washing, hardening and tempering steps where liquid such as water or oil is used.

Figure 7:
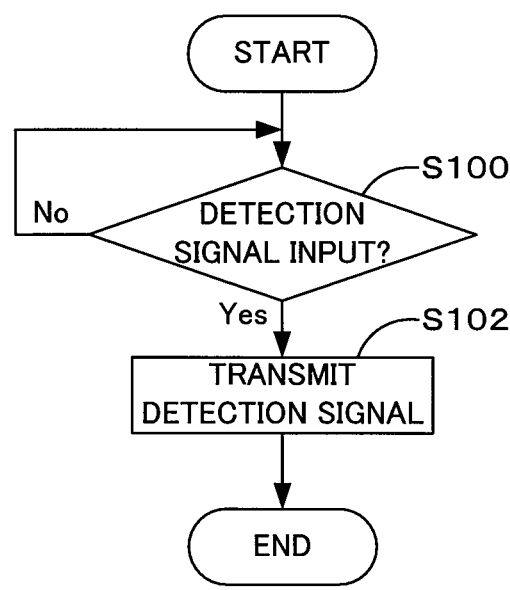
FIG. 7 is a flowchart showing a processing routine executed by the operating state acquisition apparatus according to the first embodiment.

The action of the operating state acquisition apparatus 20a will be described. FIG. 7 is a flowchart showing a processing routine executed by the operating state acquisition apparatus according to the first embodiment. The present processing routine may be repeatedly executed after the activation of the operating state acquisition apparatus 20a until the operating state acquisition apparatus 20a terminates its operation. It should be noted that the same processing may be executed by others including the operating state acquisition apparatuses 20b to 20f.

The operating state acquisition apparatus 20a, that is, the controller 23a waits for the detection signal being input from the detector 21a (step S100: No). The detector 21a may output the detection signal obtained by converting into a digital signal an analog signal indicating current or the like output from the detection element through the circuit provided therein, or may output an analog signal indicating current or the like output from the detection element as the detection signal.

Upon the detection signal being input from the detector 21a (step S100: Yes), the controller 23a transmits the input detection signal to the production management apparatus 10 via the transmission/reception unit 22a (step S102). In the case where the detection signal is an analog signal, the controller 23a converts the signal into a digital signal, and then transmits the detection signal to the production management apparatus 10 via the transmission/reception unit 22a. In the present embodiment, although the controller 23a transmits the detection signal to the production management apparatus 10 by taking as a trigger only the input of the detection signal from the detector 21a, the controller 23a may transmit the detection signal to the production management apparatus 10 by taking as a trigger the reception of a request for transmission of the operating state from the production management apparatus 10. In this case, the controller 23a stores the detection signal received from the detector 21a in the storage device included in the operating state acquisition apparatus 20a, and upon the reception of the transmission request from the production management apparatus 10, the controller 23a reads out the stored detection signal and transmits the read-out detection signal to the production management apparatus 10.

In the case where the operating state acquisition apparatus 20a is mounted on the signal tower 40, in an example, the detection signals are continuously input from the detector 21a during normal operation, but are not input from the detector 21a when abnormality occurs. In this case, the controller 23a may transmit the continuously-input detection signals as they are to the production management apparatus 10 via the transmission/reception unit 22a, or may transmit the detection signals intermittently, for example, every 10 seconds to the production management apparatus 10 via the transmission/reception unit 22a.

Figure 8:
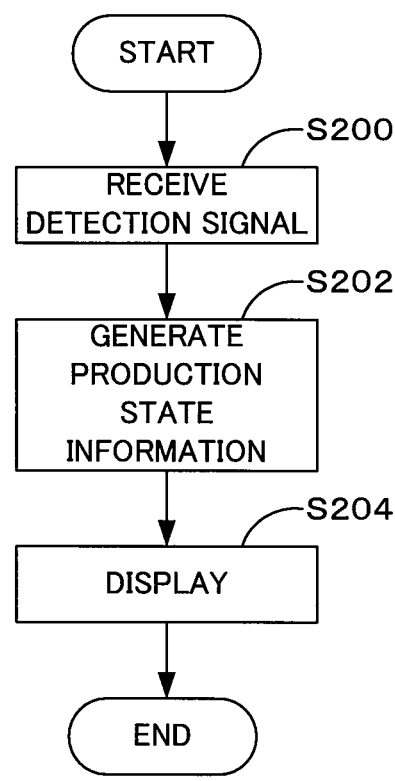
FIG. 8 is a flowchart showing a processing routine executed by the production management apparatus according to the first embodiment.

The action of the production management apparatus 10 will be described. FIG. 8 is a flowchart showing the processing routine executed by the production management apparatus according to the first embodiment. The present processing routine may be repeatedly executed after the activation of the production management apparatus 10 until the production management apparatus 10 terminates its operation. In the production management apparatus 10, the transmission/reception unit 13 receives the detection signal from the operating state acquisition apparatus 20a by wireless communication (step S200). The received detection signal is stored in the storage device 12.

The production management apparatus 10 generates the production state information by use of the received detection signal (step S202). Specifically, the CPU 11 executes a program, thereby functioning as the production state information generator 111. The production state information generator 111 is capable of generating the production state information by use of a plurality of detection signals. In an example, the production state information generator 111 may generate the information to indicate side by side the production states of various units of production equipment respectively corresponding to each detection signal, or the information to indicate the production states with respect to one manufacturing line by use of a plurality of detection signals corresponding to various units of production equipment arranged in the one manufacturing line.

In the case where the operating state of the second production equipment 32 indicated by the signal tower 40 is input as the detection signal, in an example, the production state information is generated so that the color corresponding to the operating state indicated by the input detection signal indicates the operating state of the second production equipment 32 or the manufacturing line on which the second production equipment 32 is disposed. The production state information may be generated by use of the detection signal stored in the storage device 12 and the reference pulse number 121 or the reference pulse interval 122. The reference pulse number 121 means the number of pulses per unit time period predetermined for each unit of production equipment, that is, the number of work pieces to be discharged from the production equipment per unit time period, or the number of times of completion of work processing in the production equipment per unit time period. The reference pulse interval means the pulse interval predetermined for each unit of production equipment, that is, the cycle in which work pieces are to be discharged from the production equipment or the cycle in which work processing is to be completed in the production equipment. A time interval of, for example, 20 seconds, 30 seconds is available as one cycle.

In the case of using the reference pulse number, the CPU 11 obtains the detection pulse number per unit time period from the detection signal to compare the obtained detection pulse number per unit time period with the reference pulse number, and then generates the production state information, for example, by dividing the detection pulse number by the reference pulse number. The production efficiency per unit time period may be obtained by using this production state information, and further the production efficiency for each time window (unit time) may be obtained by repeatedly generating the production state information. It should be noted that the CPU 11 may continuously count the detection pulse numbers of the received detection signals to compare the detection pulse numbers with the reference pulse number for each unit time period.

In the case of using the reference pulse interval, the CPU 11 obtains the interval, that is, the cycle, between respective pulses from the detection signals to compare the obtained detection pulse interval with the reference pulse interval, and generates the production state information, for example, by dividing the detection pulse interval by the reference pulse interval. It should be noted that the CPU 11 may continuously compare the pulse intervals, or may compare the pulse intervals for each predetermined unit time. The delay or advance of the actual production cycle in each unit of production equipment may be obtained by using this production state information, and further the delay or advance of the time-series production cycles may be obtained by repeatedly generating the production state information. It should be noted that the information indicating side by side the obtained detection pulse intervals in time series manner may be used as the production state information, without comparing the obtained detection pulse intervals with the reference pulse interval. In this case, the actual production cycle for each cycle may be grasped.

The CPU 11 stores the generated production state information in the production state information storage part 123, displays the production state information on the display device 14 (step S204), and ends the present processing routine. FIG. 9 is an explanatory drawing showing a first display example of the production state information on the display device. The display example indicates at the upper left a time T0 at which the detection signal is first input after the activation of the manufacturing line. Since the time T0 at which the detection signal is first input is indicated, the input time of the first detection signal after the activation of the manufacturing line is obvious. This enables, as a result, to more accurately grasp the state of each manufacturing line from the beginning of the operation based on the detection signal being input after the first detection signal is input, thereby enabling to confirm whether lean production is realized from the beginning of the operation. In an example, in the production equipment requiring warm-up, the time period required to stably provide a specified cycle time may be grasped as a state, and thus the measures for shortening the time period may be examined. A main display area W1 includes work shift, operation hour (h), production volume, completed volume (per hour), operation rate (%), and cycle time CT, and the cycle times CT in the present display example are all 62.0 (seconds). The work shift indicates a time zone in which each manufacturing line operates; the operation hour indicates a cumulative time for which each manufacturing line is in operation after the activation; the production volume indicates a total number of the articles to be worked produced by each manufacturing line after the activation; the completed volume per hour indicates the number of the articles to be worked produced per hour; and the operation rate indicates a rate of the production volume to a planned volume.

The production management apparatus 10 (CPU 11) is capable of providing, to a display device and a display terminal, the display data of the production state information including, in addition to the main display area W1, an arbitrary time window display area W2 to indicate a more detailed production state in an arbitrary time window selected by a user for each work shift. The display example of FIG. 9 indicates planned volumes, actual volumes and operation rates in four time zones (time windows) for a work shift 1 in the arbitrary time window display area W2. Since the planned volume, the actual volume and the operation rate are indicated for each arbitrary time zone, an administrator may grasp in detail whether or not the production is progressing as planned for each time zone, and/or which time zone has failure. In addition, an administrator may verify with a system the stop period or the actual cycle time obtained from the indication in the arbitrary time window display area W2, thereby enabling to easily grasp the obstruction factor to the production.

FIG. 10 is an explanatory drawing showing a second display example of the production state information on the display device. The display example indicates the time T0 at which the detection signal is first input after the activation of the manufacturing line, a production efficiency (%) for each manufacturing line, an operation delay (number of times of occurrence) for each unit of production equipment arranged in each manufacturing line, and a production efficiency (%). Since the time T0 at which the detection signal is first input is indicated, the state for each manufacturing line may be grasped from the beginning of the operation, thereby enabling to confirm whether lean production is realized from the beginning of the operation. A detailed display button B1 for indicating further detailed contents for the items of the operation delay and the production efficiency is arranged for each line and for each unit of production equipment. It should be noted that such indication may be performed on the display parts of the terminal devices PD1, PD2, instead of the display device 14 provided in the production management apparatus 10. In this case, the CPU 11 transmits, upon the reception of the transmission request of the production state information from the terminal device PD1 via the transmission/reception unit 13, the generated production state information to the terminal device PD1 via the transmission/reception unit 13. The terminal device PD1 displays, upon the reception of the production state information, the production state information on the display part thereof in the same form as the display example shown in FIG. 9 and FIG. 10 or in a form processed for the terminal. It should be noted that, in the case where the operating state of the second production equipment 32 indicated by the signal tower 40 is input as the detection signal from the second operating state acquisition apparatus 20b, an icon indicating each manufacturing line or each unit of production equipment on the display device 14 is colored corresponding to an operating state.

Figure 11:
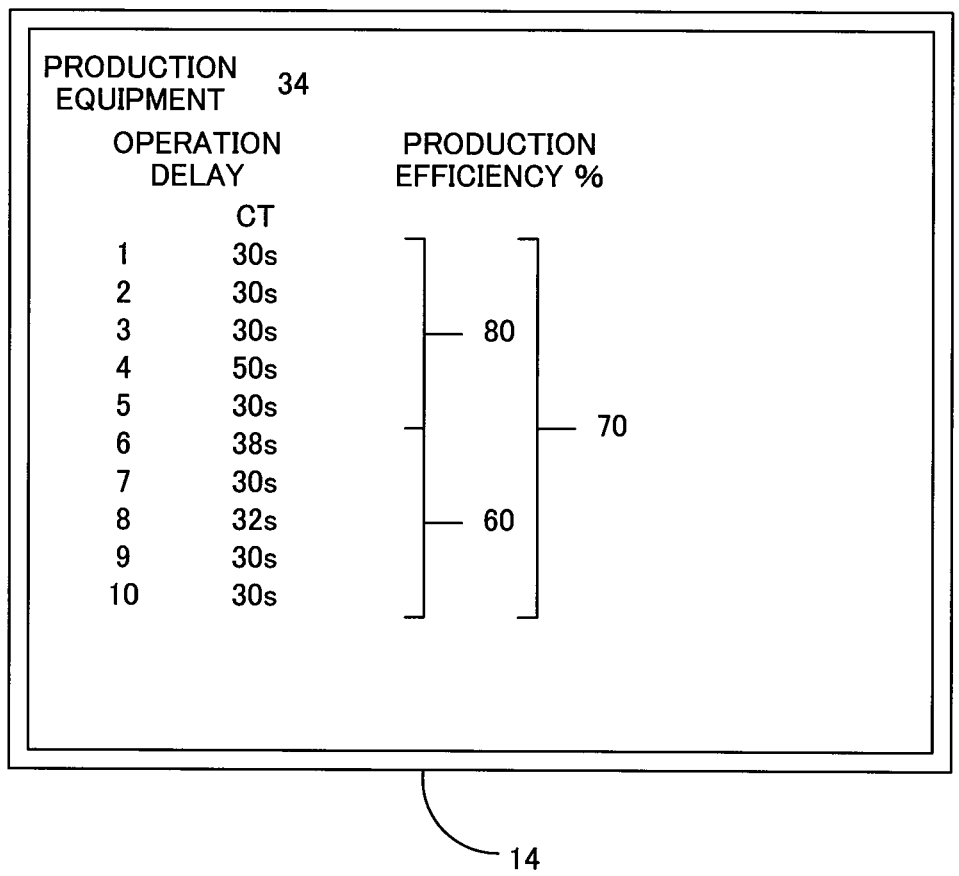
FIG. 11 is an explanatory drawing showing a first detailed display example displayed on the display device.
Figure 12:
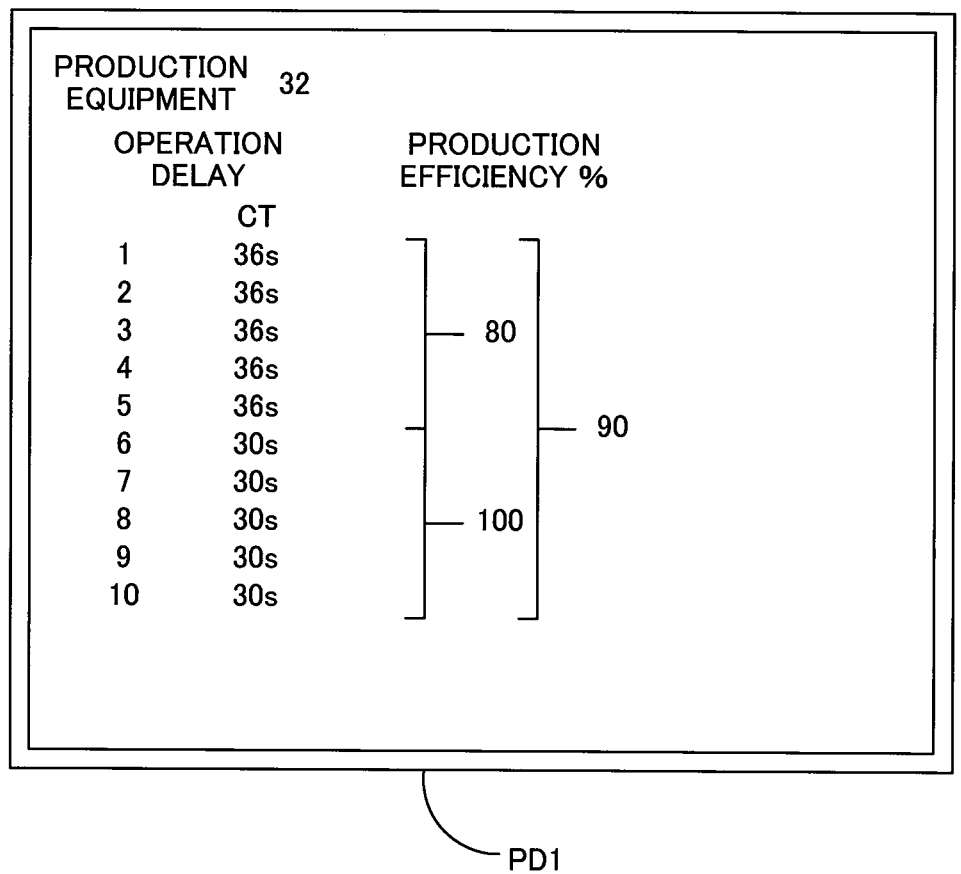
FIG. 12 is an explanatory drawing showing a second detailed display example displayed on a display part of a terminal device.

The CPU 11 displays, upon the operation of the detailed display button B1 in the display example of FIG. 10 by an operator, the details of the operation delay and the production efficiency. FIG. 11 is an explanatory drawing showing a first detailed display example displayed on the display device. FIG. 12 is an explanatory drawing showing a second detailed display example displayed on the display part of the terminal device. As shown in the first and second detailed display examples, the display form indicated after the detail display button B1 is operated indicates the cycle times, that is, the detection pulse intervals (seconds), in the reception order over a predetermined number of times (10 times in the example of the figures). The example of FIG. 11 indicates that some detection pulse intervals lengthen randomly, and thus the state of delay occurring in the production equipment may be grasped. The example of FIG. 12 indicates that the detection pulse intervals in any of the first time to the fifth time lengthen by a fixed width, and thus the state of steady delay occurring in the production equipment may be grasped. Further, in the case where the detection pulse interval is equal to or longer than a specified time period, the interval term may be regarded as a stop term, and the stop occurrence time and the length of the stop period may be indicated. The stop events having occurred in a predetermined time window or in an arbitrary time window set by a user may be indicated in descending order of length of the stop period. These types of production state information are the information which may not be acquired by any PLC provided in the production equipment to control the action of the production equipment. In addition, according to the conventional method of managing the operation rate based on the number of finished pieces, the cause of the operation rate being low is not easy to be found out. However, the use of the production management apparatus 10 and the operating state acquisition apparatuses 20a to 20f according to the present embodiment enables to grasp in detail an production efficiency and operation delay for each manufacturing line and for each unit of production equipment, which contributing to solving of the cause of the operation rate being low.

FIG. 13 is an explanatory drawing showing a third display example of the production state information on the display device. The third display example indicates a stop period, an occurrence time and a return time in descending order of the stop period. This enables to examine the stop factors in descending order of the stop period, thereby enabling, as a result, to prevent the stop on the manufacturing line or to shorten the stop period. FIG. 14 is an explanatory drawing showing a fourth display example of the production state information on the display device. The fourth display example indicates an input time of the detection signal and a cycle time CT which is an input time interval of each detection signal. A cycle time CT1 has a length of approx. ten times of other cycle times, and thus the event that an abnormal stop has occurred may be grasped. That is, this enables to grasp the accurate time when the abnormal stop has occurred, thus enables to accurately and precisely verify the operating state of the production equipment in a production cycle such as half a day or one day. In addition, based on the trend of the cycle time such as half a day or one day, detailed verification may be made with regard to, for example, whether the delay or fluctuation of the cycle time has been caused by warming up in the production equipment or by a sudden abnormality.

As described above, each of the operating state acquisition apparatuses 20a to 20f in the first embodiment is capable of easily acquiring information on the operating state of the production equipment. That is, each of the operating state acquisition apparatuses 20a to 20f includes a sensor selected corresponding to the production equipment among the general types of sensors as the detectors 21a to 21f, and may be retrofitted so as to acquire the operating state of the production equipment. Therefore, even if the production equipment is manually operated or includes no PLC, the information on the operating state of the production equipment may be acquired by use of a general sensor and without requiring complicated wiring work. In addition, the use of the simple operating state acquisition apparatuses 20a to 20f being different from a PLC enables to easily take out the information on the operating state of the production equipment which conventionally has not been the object to be acquired by a PLC for controlling the production equipment, and/or the information on the operating state which has not been easily taken out from a PLC. Furthermore, a measuring person may not be disposed to acquire the information on the operating state of the production equipment, thereby enabling to eliminate the variance in acquisition of the information on the operating state of the production equipment depending on the measuring persons.

The operating state acquisition apparatuses 20a to 20f in the first embodiment are capable of accurately acquiring, for example, the stop occurrence time and its length as the operating state of each of the production equipment 31 to 36, thus enabling to quantitatively grasp the level of the problem to give priority in problem solving. In addition, since the operating state of each of the production equipment 31 to 36 is immediately transmitted from the operating state acquisition apparatuses 20a to 20f, the problem examination may be accurately executed before operator's memory becomes ambiguous. Further, since each of the operating state acquisition apparatuses 20a to 20f is capable of steadily acquiring the operating state of each of the production equipment 31 to 36, the objective, averaged and reliable information on the operating state of the production equipment may be acquired, thereby enabling to carry out meaningful examination to the problem by use of the information on the operating state.

The production management apparatus 10 in the first embodiment is capable of generating, by use of the information on the operating state input from each of the operating state acquisition apparatuses 20a to 20f, the production state information indicating the production state and the production efficiency for each of the manufacturing lines L1 and L2 and for each of the production equipment 31 to 36. Further, the production management apparatus 10 in the first embodiment generates the production state information by use of the information such as of start, in operation, stop and completion of working and processing to the individual articles to be worked, acquired through the operating state acquisition apparatuses 20a to 20f, thus enabling to grasp the operating state and the production state of each of the manufacturing lines L1 and L2 and each of the production equipment 31 to 36 per unit time period. This enables, as a result, to precisely examine delay and the cause of the delay in production for each manufacturing line and each unit of production equipment, and to visualize the delay caused by a small problem not causing an abnormal stop in the production equipment, or a small difference when the cycle time changes due to the production equipment or an operator.

On the other hand, it may not be possible to specify or verify the delay and the cause of the delay in production for each manufacturing line or each unit of production equipment, in the conventional management method in which the manufacturing line is evaluated from the viewpoint of the number of production pieces. That is, it is impossible to acquire the information on the production state and the production efficiency of the manufacturing line and the production equipment per unit time period, based on the conventionally-acquired information on the production equipment, for example, the information such as of a Gantt chart of the manufacturing line acquired from the signal tower indicating being in operation or abnormal state. Also, a problem is found out only after the production equipment stops abnormally.

Further, the production management apparatus 10 according to the first embodiment is capable of generating the production state information which is detectable of the delay and the cause of the delay in production for each manufacturing line and for each unit of production equipment, taking into consideration a time element, for example, a cycle time by use of the information on the operating state of the production equipment, which is acquired from the production equipment not equipped with a PLC or which has not been acquired by a PLC conventionally, through the operating state acquisition apparatuses 20a to 20f. The production state information may be used to acquire a production efficiency and an operation rate for each manufacturing line, thus enabling to easily perform progress management and the like while taking into consideration the time element through a statistical analysis of the production state information.

The production management system 100 according to the first embodiment is capable of providing the production state information to the terminal devices PD1, PD2, thereby enabling to grasp the production state of the manufacturing line and the production equipment in a remote place and analyze the cause of delay if any delay occurs, so as to examine measures.

Modifications:

(1) In the first embodiment, three units of production equipment are disposed on each of the manufacturing lines L1 and L2. However, one or two units of production equipment may be provided, or even four or more units may be provided. The number of manufacturing lines, as well, may be one or two, or may be three or more.

(2) The display form of the production state information on the display screen in the first embodiment is just an example. Each display area may further include indication of an actual production volume, a planned production volume, and an operation hour of the manufacturing lines. Furthermore, a button for requesting the indication of a display history may be arranged to indicate a calendar, and a desired date is selected on the indicated calendar, and thereby the production state information as of the selected date may be indicated. In addition, the colors for indication may be changed at a boundary corresponding to a reference operation rate, to indicate an operation rate for each time zone and an operation rate through the entire operation hour. Besides these, various forms are available as an indication form, such as a list form, a graphic form and a drawing form.

(3) In the first embodiment, the production management apparatus 10 and each of the operating state acquisition apparatuses 20a to 20f communicate by wireless communication, but may communicate by wired communication. In an example, in the case where a connection port for a wired local area network (LAN) is arranged in the vicinity of each of the production equipment 31 to 36, the production management system 100 according to the first embodiment may be easily introduced as in the case of wireless communication, without requiring additional time and labor for wiring, by use of the connection port.

(4) In the first embodiment, the detection signal is converted into a pulse signal, that is, converted into a digital signal in each of the operating state acquisition apparatuses 20a to 20f, but such conversion may be executed in the production management apparatus 10. That is, an analog signal may be transmitted from each of the operating state acquisition apparatuses 20a to 20f to the production management apparatus 10, and the above-described pulse signal conversion may be executed in the production management apparatus 10.

Although the present invention has been described based on the embodiments and the modifications, the embodiments described above of the present invention are just for facilitating the understanding of the present invention and do not limit the present invention. The present invention may be changed or improved without departing from the spirit and the scope of the claims, and the equivalents thereof are included in the present invention.

What is claimed is:

1. An operating state acquisition apparatus retrofitted and used for managing a production state of a manufacturing line, the operating state acquisition apparatus comprising:
    a detector retrofitted to be mounted on a production equipment disposed on the manufacturing line, or retrofitted to be disposed in a vicinity of the production equipment, the detector detecting an operating state of the production equipment and outputting a detection signal indicating the operating state of the production equipment, wherein the detector includes a second detector for detecting a start or a completion of a processing action of the production equipment and outputting a detection pulse signal corresponding to the start or the completion of the processing action of the production equipment, as the detection signal indicating the operating state of the production equipment; and
    a transmitter configured to transmit the detection signal to a management apparatus different from an apparatus for controlling the production equipment.

2. The operating state acquisition apparatus according to claim 1, wherein
    the production equipment includes a display apparatus indicating an operating state of the production equipment by light, and
    the detector includes, as a first detector, a light sensor mounted on the display apparatus, the light sensor acquiring the operating state indicated by the display apparatus to output the detection signal.

3. The operating state acquisition apparatus according to claim 1, wherein
the second detector is a detector for counting a number of times of start, in operation or completion of the processing action of the production equipment.

4. The operating state acquisition apparatus according to claim 3, wherein
the second detector is at least one detector selected from a group including a light sensor, a sound sensor, a heat sensor, a current sensor, a distance sensor, an atmospheric pressure sensor, an acceleration sensor, a rotational speed sensor, a humidity sensor and a pressure sensor.

5. The operating state acquisition apparatus according to claim 2, wherein
the second detector is a detector for counting a number of times of start, in operation or completion of the processing action of the production equipment.

6. The operating state acquisition apparatus according to claim 5, wherein
the second detector is at least one detector selected from a group including a light sensor, a sound sensor, a heat sensor, a current sensor, a distance sensor, an atmospheric pressure sensor, an acceleration sensor, a rotational speed sensor, a humidity sensor and a pressure sensor.

7. A production management system for managing a production state of a manufacturing line, the production management system comprising:
the operating state acquisition apparatus according to claim 1; and
the management apparatus configured to receive the detection signal transmitted from the operating state acquisition apparatus.

8. The production management system according to claim 7, wherein
the management apparatus includes a generation unit for receiving a plurality of the detection signals and generating an information on production state of the manufacturing line by use of the received plurality of detection signals.

9. A production management method of managing a production state of a manufacturing line, the production management method comprising:
receiving, from an operating state acquisition apparatus having a detector retrofitted to be mounted on a production equipment disposed on the manufacturing line, or retrofitted to be disposed in a vicinity of the production equipment, a detection signal indicating an operating state of the production equipment, wherein the detector detects an operating state of the production equipment and includes a second detector for detecting a start or a completion of a processing action of the production equipment and outputting a detection pulse signal corresponding to start or completion of a processing action of the production equipment, as the detection signal indicating the operating state of the production equipment; and
transmitting the received detection signal to a management apparatus.

10. The operating state acquisition apparatus according to claim 1, wherein the detection pulse signal is used to generate a cycle time.

11. The operating state acquisition apparatus according to claim 9, wherein the detection pulse signal is used to generate a cycle time.

* * * * *